J. C. McKenzie.

Tile Machine.

N° 89,878.    Patented May 11, 1869.

Witnesses,
Wm. H. Prereton Jr
W. B. Denning

Inventor;
J. C. McKenzie
by Knight Bros
Attorneys

United States Patent Office.

JOSEPH C. McKENZIE, OF ADRIAN, MICHIGAN.

Letters Patent No. 89,878, dated May 11, 1869.

---

IMPROVED TILE-MACHINE.

---

The Schedule referred to in these Letters Patent and making part of the same.

---

*To all whom it may concern:*

Be it known that I, JOSEPH C. McKENZIE, of Adrian, in the county of Lenawee, and State of Michigan, have invented a new and useful Improvement in Tile-Machines; and I do hereby declare the following to be a full, clear, and exact description of the same, sufficient to enable those skilled in the art to which it pertains, to manufacture and use it.

My invention consists in constructing a covered trough or box, which is to contain the cutting-knives, so as to prevent the clogging of the knives with clay; and also, in an adjustable core, made so by means of set-screws, arranged as hereinafter set forth; and also, in the peculiar shape of the cutting-knives for working the clay.

In the accompanying drawings, forming part of this specification—

Figure 1:
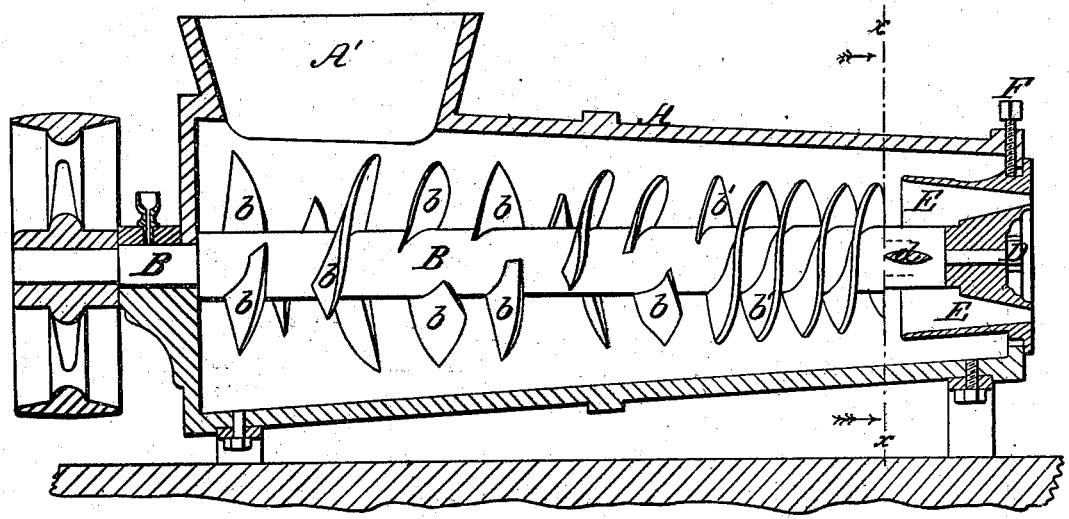
Figure 2:
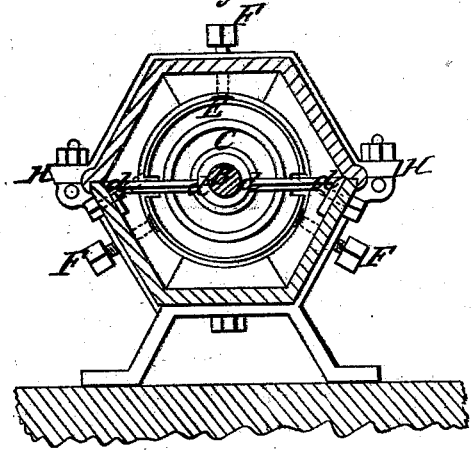

Figure 1 shows a side elevation of my improved tile-machine, partly in section, and Figure 2 a transverse section, on the line $x$ $x$, fig. 1, showing the adjustable core.

A represents a box or covered trough, preferably of hexagonal or octagonal form, tapering, gradually, from the feeding to the discharging-end; but it may be made to contain a greater or less number of angles, only so that it be not square or cylindrical. I find this shape advantageous over all others, for the reason, that the knives do not clog, as in ordinary troughs or boxes, on account of the angles, which, while they are too obtuse to permit the clay to stick fast, still present recesses sufficiently deep to permit of the clay falling from the knives when they first begin to clog, thus enabling the next row of knives to cut it up as the shaft, containing the cutters, revolves.

A' is the hopper, where the clay is introduced.

B is the shaft, running horizontally through the centre of the trough, supplied with knives, $b$, of a peculiar shape, arranged, and securely fastened upon the shaft B, so as to form, when completed, a double screw-thread, divided, however, along the line of the shaft, into several sections.

These knives $b$ are, in shape, very much like the lower half turn of the bit of an auger, with the working-face concave, the outer edge sharpened, and the inner fastened to the shaft, as shown in the drawings.

The shape of these knives adapts them to the trough in which they move, and their being divided and arranged as described, also in conjunction with the peculiar shape of the trough, tend to prevent the knives or trough clogging with the clay, as so often happens in the ordinary tile-machines in use.

At the discharging-end of the trough or box, the shaft B is provided with a screw, $b'$, similar to the shape of the knife $b$, only not divided, which forces the clay into the mould E, surrounding the core C.

This converging mould E is adjustable by means of the set-screws F, so that while the core C remains stationary, the thickness of the tile to be made may be regulated, so that one side may be thicker than the other, or all sides alike.

The core C is fastened to a cross-bar, $d$, that supports the end of the revolving shaft B, by means of a screw, D, which permits the core to be taken out and exchanged for one of different size and shape, when desired.

The box or trough A may be made in two pieces, if desired, and fastened together by means of the swing-bolts H, or may be constructed in any desirable manner, of metal or wood.

I am well aware that cutting-knives and screw-threads fastened permanently to a revolving shaft, have before been used, as, also, have stationary cores.

I am also aware that knives, for like uses with those in my invention, and which, when taken separately, are of similar construction, have been used before in the rejected application of J. J. Alvord, of 1861; and I am also acquainted with the fact, that an appliance for moulding tiles, somewhat similar to mine, is shown in the patent of George S. Tiffany, of February 26, 1861.

The one shown by him, however, permits only the mould, or a part thereof, to be removed, and another mould or thimble substituted, in order to make tiles of different thicknesses, while, in my invention, the mould E is itself adjustable, by means of the screws F.

I do not, therefore, claim, broadly, the combination of cutting-knives, and a screw-thread and shaft, working in an ordinary trough.

Neither do I claim the peculiar shape of the individual knives, as shown by Alvord, or the removable thimble or mould, as shown in the patent of Tiffany, referred to above; but What I do claim as new, and of my own invention, and for which I desire to procure Letters Patent, is—

1. The adjustable mould E, surrounding the core C, in combination with the screws F F F, operating substantially as and for the purposes set forth.

2. In combination with the tapering angular trough A, the swing-bolts H, operating as and for the purposes set forth.

3. The combination of the tapering angular trough A, the shaft B, when supplied with the knives $b$, and screw $b'$, and the screws F, and mould E, and core C, substantially as and operating in the manner set forth.

JOSEPH C. McKENZIE.

Witnesses:
MORTON EDDY,
H. M. COLE.